United States Patent

[11] 3,588,685

| [72] | Inventors | Kai B. Fallenius<br>Tapiola;<br>Keijo A. Varmola, Helsinki, Finland |
|---|---|---|
| [21] | Appl. No. | 719,189 |
| [22] | Filed | Apr. 5, 1968 |
| [45] | Patented | June 28, 1971 |
| [73] | Assignee | Outokumpu Oy<br>Helsinki, Finland |
| [32] | Priority | Apr. 10, 1967 |
| [33] | | Finland |
| [31] | | 1053/67 |

[54] DEVICE FOR DETECTING NONMAGNETIC OR MAGNETIC CONDUCTING BODIES FOR CONVEYORS USING COILS WHOSE PROJECTION ON THE CONVEYORS ARE ESSENTIALLY TRAPEZOIDAL
12 Claims, 16 Drawing Figs.

| [52] | U.S. Cl. | 324/41 |
| [51] | Int. Cl. | G01r 33/00 |
| [50] | Field of Search | 324/41, 34, 40; 209/111.8 |

[56] References Cited
UNITED STATES PATENTS

| 3,020,470 | 2/1962 | Shawhan et al. | 324/41 |

FOREIGN PATENTS

| 480,447 | 1/1952 | Canada | 324/41 |

Primary Examiner—Rudolph V. Rolinec
Assistant Examiner—R. J. Corcoran
Attorney—Albert M. Parker ABSTRACT: This invention relates to a method and a device for detecting electromagnetically nonmagnetic or magnetic conducting bodies, e.g. metal bodies, from a medium (surrounding material) different from the material of the bodies, applied particularly for detecting magnetic and nonmagnetic metal scrap from belt conveyed magnetic and/or conducting ore or ore product.

The operation of the metal detector according to the invention is based on the different conductivity of ores and metals, by detecting such a component of the secondary field caused by a body in an electromagnetic alternating field, as is small for the ore material but large for metals because of their good conductivity. The detector comprises an audio frequency transmitting system, a receiving system to detect the field caused by the metal bodies, a signal amplifier, a coherent detector which separates a component of certain phase from the signal received and finally a monitor circuitry for the analysis of the signal observed and for the forming of an alarm signal. The transmitter is constructed to produce a field which varies in direction as a function of position in the field so that a detectable signal is received at one point at least of the influence area, irrespective of the shape, direction and position of the body on the belt when the body moves through the influence area of the instrument (usually that of a coil system). The signals caused in the receiving system by the transmitter and the evenly distributed surrounding (ore) material are made zero either by using a bridge connection of the coils or by a suitable construction of the receiving coil system.

PATENTED JUN 28 1971

KAI BERTEL FALLENIUS
and KEIJO ARMAS VARMOLA
INVENTORS.

BY Albert M. Parker
ATTORNEY.

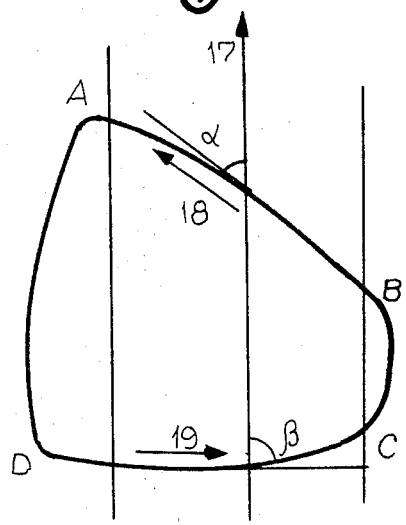
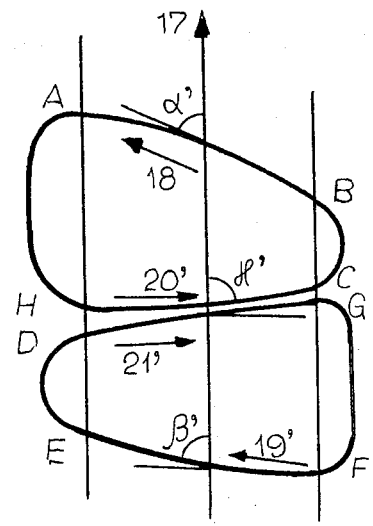
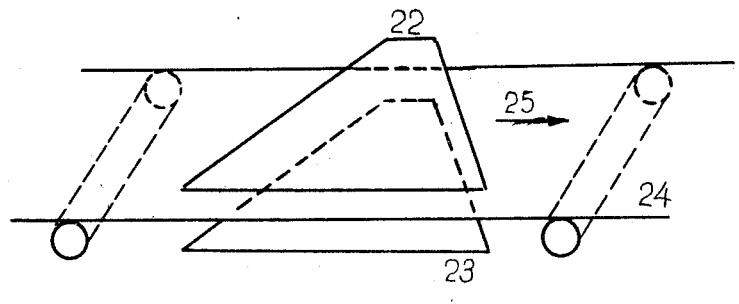
Kai Bertel Fallenius
and Keijo Armas Varmola
INVENTORS.
BY Albert M. Parker
ATTORNEY.

KAI BERTEL FALLENIUS
and KEIJO ARMAS VARMOLA
INVENTORS.

BY *Albert M. Parker*
ATTORNEY.

KAI BERTEL FALLENIUS
and KEIJO ARMAS VARMOLA
INVENTORS.
BY Albert M. Parker
ATTORNEY.

KAI BERTEL FALLENIUS
and KEIJO ARMAS VARMOLA
INVENTORS.

BY Albert M. Parker
ATTORNEY.

DEVICE FOR DETECTING NONMAGNETIC OR MAGNETIC CONDUCTING BODIES FOR CONVEYORS USING COILS WHOSE PROJECTION ON THE CONVEYORS ARE ESSENTIALLY TRAPEZOIDAL

BACKGROUND OF THE INVENTION

1. Field of the Invention

This invention relates to a method and a device for electromagnetically detecting nonmagnetic or magnetic conducting bodies, e.g. metal bodies, from a medium (surrounding material) different from the material of the bodies, applied particularly for detecting magnetic and nonmagnetic metal scrap from belt conveyed magnetic and/or conducting ore or ore product.

2. Description of the Prior Art

The electromagnetic method for detecting metal bodies is based on changes in the operation of the detector (usually a coil or a coil system) when the metal bodies come into the influence area of the detector. The methods in use are based on three main principles as follows.

Balanced coil system, where the body to be detected changes the impedance of one or more coils or the mutual coupling between the coils. A quantity (usually voltage) indicating a deviation from the balance of the coil system is used for detection. The method is carried out by placing one or more detecting coils sensitive to the body as parts of an alternating current bridge so that the output voltage is zero at balance condition. Alternately one or more coils are used as transmitting antennas, while the other coils or coils operate as receiving antennas so that the mutual coupling between the transmitting and receiving systems and the signal received are zero or artificially set at zero.

The changes of the Q-value of the detector. The detecting coil forms a part of an oscillatory circuit and the change caused by the metal body in the Q-value of the circuit is used for detection. The amplitude of oscillation in the circuit is kept constant by the aid of slowly reacting control circuitry. When the metal object moves with sufficient speed into the influence area of the coil, the changes of the Q-value produces an amplitude disturbance, which acts as detecting quantity.

Flux distortion, where a static magnetic field is produced in the control area and changes caused by the body in the magnetic flux distribution are detected. When the body moves in the field produced by the aid of direct current coils or permanent magnets, the continuous flux change caused by the body induces in the detecting coils a voltage proportional to the speed of the body. This voltage is the detecting quantity.

Since principles A and B are based on the measuring of the changes caused in the total influence of the body to be detected, the surrounding material, particularly if it contains magnetic bodies, causes signals which are equal to or stronger than the signals to be detected. Likewise the signals of nonmagnetic bodies are often insignificant compared with the total signal of even weakly magnetic surrounding material. Therefore methods A and B can be applied to detect metal bodies only from nonmagnetic or from very weakly magnetic surroundings. The use of two or more frequencies has not improved the methods to an extent which would compensate for the increased complexity of the instrument.

Since method C is based on the magnetic properties of material, it cannot be used at all in magnetic surroundings. Moreover it is not possible to detect nonmagnetic metal bodies by using this method.

SUMMARY OF THE INVENTION

The main object of the invention is to create a method for The electromagnetic detection of magnetic or nonmagnetic conductive bodies such as metal bodies conveyed on a belt surrounded by a medium of material having different electrical conductivity from the bodies to be detected by creating an audio frequency primary electromagnetic field through which the belt passes, by means of a stationary coil system. The amplitude and direction of the primary field at any point varying as of function of the point's position in the field, so that when a body to be detected moves through the field within range of a detector. The body passes through at least one point at which the direction of the primary field is effective to set up eddy currents in the body or to magnetize the body. This effect upon the body produces a detectable secondary field which is independent of the shape, orientation and position of the body on the conveyor. One or more preselected components of the secondary field produced are observed. The components being shifted in phase with respect to the primary field. The components chosen differ in size for the bodies to be detected from those associated with the surrounding material in the medium due to the difference in electrical conductivity between the bodies and the medium. A receiving coil system is so positioned that when a body to be detected is at the advantageous point at which a detectable secondary field is produced, the body is also favorably located with respect to a signal producing part of the receiving system. A signal or signals proportional to the selected phase shifted component or components are electronically compared with respective selected limit values. Another object of the invention is to provide an apparatus for carrying out the method of the invention.

The operation of the metal detector according to the invention is based on the different conductivity of ores and metals, by detecting such a component of the secondary field caused by a body in an electromagnetic alternating field, as is small for the ore material but large for metals because of their good conductivity. The detector comprises an audio frequency transmitting system, a receiving system to detect the field caused by the metal bodies, a signal amplifier, a phase sensitive detector which separates a component of certain phase from the signal received and finally a monitor circuitry for the analysis of the signal observed and for the forming of an alarm signal. The transmitter is constructed to produce a field which varies in direction as a function of position in the field so that a detectable signal is received at one point at least of the influence area. Irrespective of the shape, direction and position of the body on the belt when the body moves through the influence area of the instrument (usually that of a coil system). The signals caused in the receiving system by the transmitter and the evenly distributed surrounding (ore) material are made zero either by using a bridge connection of the coils or by a suitable construction of the receiving coil system.

BRIEF DESCRIPTION OF THE DRAWINGS

FIG. 4 shows the perpendicular projection of a general transmitting coil construction into the plane of the conveyor belt.

FIG. 5 shows the perpendicular projection of a general measuring coil construction into the plane of the conveyor belt.

FIG. 6 shows one plane coil construction corresponding to FIGS. 4 and 5.

DESCRIPTION OF THE PREFERRED EMBODIMENTS

The method according to the invention and some instruments for the application of the method are described in detail in the following with reference to the attached drawings.

Figure 1:
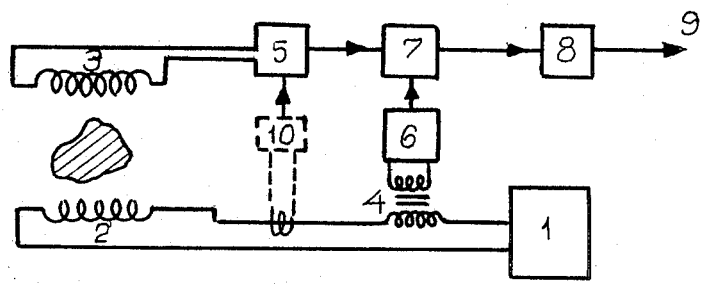
FIG. 1 shows a block diagram of one preferred detector construction in accordance with the invention.

In the block diagram of FIG. 1 the transmitting coil 2 is fed by an audiofrequency oscillator 1. The voltage induced in the receiving coil 3 by the material to be controlled is fed to the amplifier 5 which has been slightly tuned to the (operation) frequency of the transmitter in order to decrease harmonics and disturbances. The phase of the amplifier output is not dependent on the amplitude. The signal amplified goes to a phase sensitive detector 7, where a component with a predetermined phase relationship to the transmitter field is separated from the received signal. The reference voltage of the detector is formed with a transformer from the transmitting circuit. After transformation the voltage is amplified and its phase corrected if necessary. Moreover the voltage is changed to rectangular wave (block 6) in order to improve the operation of the detector and is fed to the coherent detector. The reference voltage can also be formed with a series resistor directly from the transmitting current. Furthermore it can be taken as a voltage from the poles of the transmitter or formed with a separate coil placed near the transmitting coil. The signal component chosen by the coherent detector goes further to the monitor 8, where an alarm signal 9 (e.g. sound or light) is formed by the aid of low frequency amplifiers, level detectors, logical and/or circuits and delay circuits. This alarm signal indicates when a metal body has been detected and is to be taken away from the conveyor—IF necessary by stopping the conveyor manually or automatically. By the aid of an auxiliary voltage taken from the transmitter circuit in the same way as the reference voltage of the detector any remaining voltage of the signal amplifier can be cancelled out, thus improving the performance of the circuitry.

For efficient operation it is necessary that the number of alarm signals caused by the bodies to be detected should be as great as possible compared with the number of alarm signals caused by bodies or accumulations of ore material, while the influence of the transmitter field, of external electromagnetic fields and of surrounding material homogeneous in the direction of belt motion should be made as small as possible. In the detector according to the invention the principles mentioned above are carried out as follows:

a. the correct phase component of the electromagnetic secondary field caused by a disturbing body is monitored, b. the correct operation frequency is chosen, c. the primary field is so directed to be advantageous for the detection of the bodies, d. the secondary field produced by the body to be detected is observed from a direction that is advantageous for the detection, e. the coil system is designed so that the transmitter field, homogeneous ore material or external fields do not cause signals.

f. the signal component having a correct phase is handled suitably i.e. the operation principle of the monitor is chosen accordingly.

The secondary field produced by a conducting body in an electromagnetic alternating field can be divided into a component in phase with the primary field (=real component) and a component with a 90° phase shift (=imaginary component). The secondary field can be represented in the real-imaginary coordinates per volume unit of the body as a function of the ratio between the dimensions of the body and the penetration depth, or as a total field as a function of frequency, body size etc.

According to the Induction Law it is advantageous to choose as high a frequency as possible. The largest ratio between the size of the biggest existing body of surrounding material and the smallest metal body possible to detect is reached when this ratio is independent of frequency. The upper limit of the operation frequency is thus determined from the greatest value of the body dimension per penetration depth at which the above mentioned independence is still prevailing, at least approximately.

Drawing a line parallel to the real axis from the point representing the operation frequency of the total field curve of the surrounding material, the line intersects the frequency curve of the corresponding metal body at a point which gives the size of the smallest body possible of detection.

In practice the shapes of the bodies to be detected and that of the ore material bodies differ from each other. Each shape is represented by a family of curves and each shape and material by certain curves. The detection can be made more effective by using the component deviating in phase slightly from the imaginary component. The choice is based on the curves obtained either experimentally or theoretically of the surrounding material or ore body that causes the largest imaginary component and of the body to be detected that causes the smallest imaginary component either because of its shape or material constants.

Figure 2:
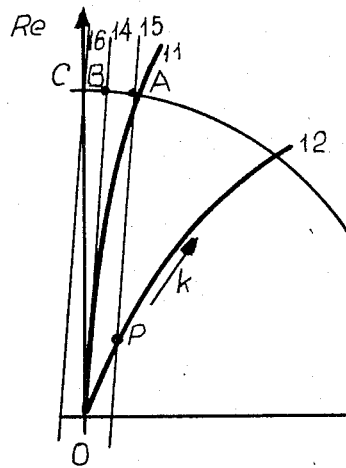
FIGS. 2 and 3 show signals of ore material and of a metal body in the real-imaginary coordinate system as a function of body size and the choice of quantities to be measured on the basis of these curves.

The curves in which the size $k$ is a variable are represented by reference numerals 11 and 12 in FIG. 2. For sake of clarity the curve of the surrounding material is drawn to curve away from the real axis faster than it does in reality.

Figure 3:
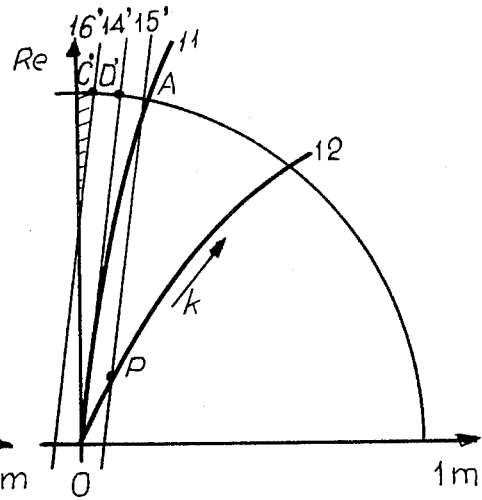

The circular arc 13 shows the largest signal that can be fed into the signal amplifier without causing nonlinearity. The gains are adjusted so that point A of the total signal corresponding to the greatest existing ore material body or accumulation of bodies hits the circumference. Arc AC is halved and a line 14 is drawn through the center point B and the origin O. Moreover lines 15 and 16 are drawn parallel with line 14 through the points A and C. A component perpendicular to the fundamental line 14 or phase line is chosen to be the component that will be monitored, whereupon the same component of the signal caused by the surrounding material always remains on the left side of line 15. The detector is dimensioned so that all the bodies whose component of chosen phase reaches the right side of the line 15 (the so-called alarm limit) cause detection. Point P represents the smallest body that can be detected. Even smaller bodies may be detected if the line 15 (alarm limit) is rotated around point A so that it cuts the imaginary axis nearer the origin than in FIG. 2. The intersecting point B of the phase line moves correspondingly to the right and the component to be detected deviates more from the imaginary component. A situation shown in FIG. 3 is obtained. The signals which hit the ruled area between the real axis and the left alarm limit 16' are produced by separate ore material bodies or accumulations, and the number of alarms they cause can be diminished by choosing a suitable monitor principle.

A construction of coils with air or iron cores is generally used to produce the primary field of the detector and to pick up the signal. Since curve 12 in FIGS. 2 and 3 depends on the shape of the body, the coils must be constructed so that the detection at one point at least of the detector takes place in the most advantageous direction. The direction of the primary field must vary as a function of position in the direction of material motion so that the imaginary or nearly imaginary component of the signal produced by the body to be detected is as big as possible at some point of the detector. When detection is ordered e.g. of cylindrical or elongated ferromagnetic bodies, the direction of the field must be at some point during the motion of the body parallel or nearly parallel to the longitudinal axis of the body, whereupon the imaginary part of the dipole moment induced in the body is the largest. Correspondingly for a nonmagnetic plate the field is to be perpendicular or nearly perpendicular to the plane of the plate.

According to the invention the above-mentioned field can be produced with a transmitting coil construction if its perpendicular projection to the plane of the conveyor is that of FIG. 4. The projections of the coil current 18 and 19 are in parts directed along lines AB and CD so that the angles $\alpha$ and $\beta$ which they form with the direction of motion are at every point on different sides of line 17, which represents the direction of motion. It is often advantageous if the current running in the coil parts corresponding to the parts BC and DA of the projection make as small a contribution as possible to the primary field as compared with the contribution of the parts corresponding to projections AB and CD.

In several illustrated embodiments of the invention the transmitting and/or receiving coil systems are so formed that their perpendicular projections on to the plane of the conveyor are essentially trapezoidal in form. The term "essentially trapezoidal" as used in this specification and in the appended claims is intended to comprehend shapes like the projected forms shown in FIGS. 4 and 5 of the drawing where the projections are like trapezoids somewhat rounded out, as well as pure trapezoid shapes as shown in FIGS. 6,8,9,11 and 12.

FIG. 5 shows a perpendicular projection to the plane of the conveyor of a measuring or receiving coil constructed according to the same principle as above. The voltage induced in the coil consisting of two loops causes a current to flow in the coil. The projections 18' and 19' of the current directions in parts AB and EF make the angles $\alpha'$ and $\beta'$ with the direction of motion on the same side of the line 17 representing the direction of motion. Projections 20 and 21 are parallel or nearly parallel along the projection parts CD and HG and form the angle $\nu'$ with the direction of motion on the other side of line 17 from the angles of the projections 18' and 19'.

It is often advantageous if the contribution of the coil parts corresponding to the projections BC, DE, FIG. and HA to the measuring current is small compared with the contribution of the coil parts corresponding to AB, CD, EF and GH. The two loops of the coil must be so designed that the voltages induced by the transmitter field, homogeneous external fields and homogeneous fundamental material deposits cancel out in the measuring coil.

In practice it is often advantageous to construct the coils corresponding to FIGS. 4 and 5 so that the projections and the corresponding coils consist of straight parts. A plane coil construction of this kind according to the invention can be seen in FIG. 6. The transmitting coil 22 and measuring coil 23 are on different sides of the conveyor 24. In this case the signals caused by the bodies to be detected are less dependent on the height position of the body on the belt. Arrow 25 shows the direction of motion.

Figure 7:
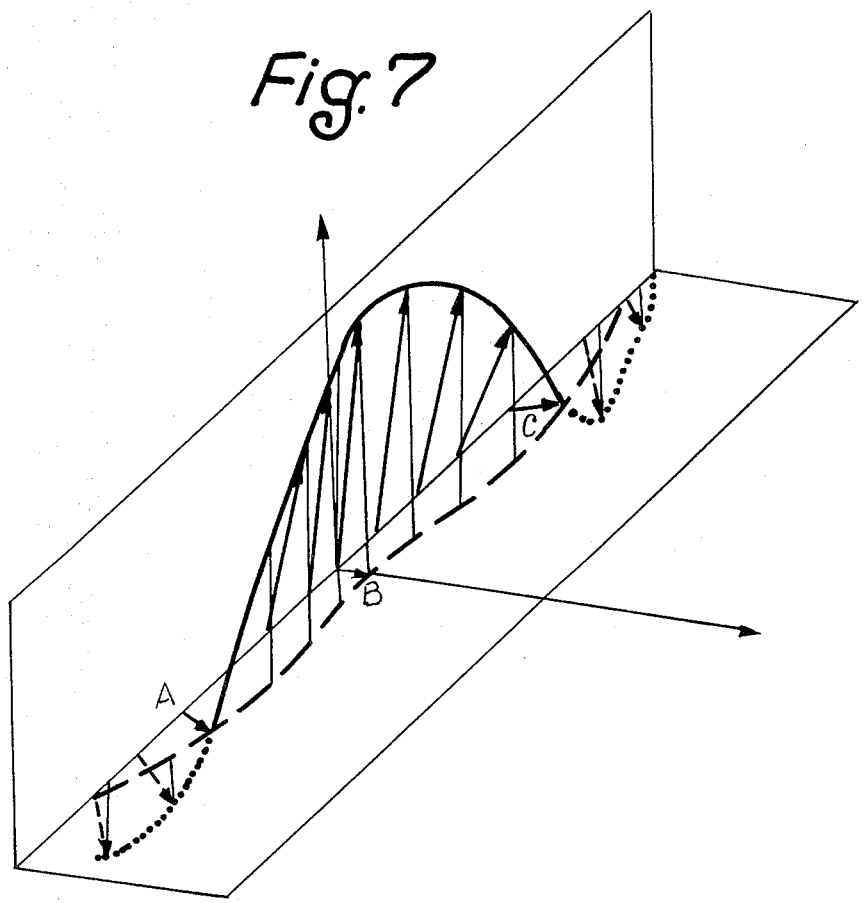
FIG. 7 shows direction changes of the field vector along the line AC parallel to the direction of belt motion for the transmitting coil of FIG. 8.
Figure 8:
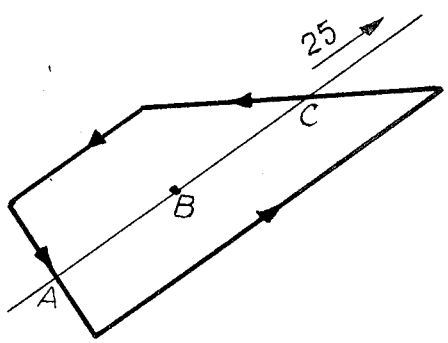
FIG. 8 shows the projection of the transmitting coil into the plane of the conveyor belt.

In FIG. 7 the continuous curve (dotted below the horizontal plane) shows the total transmitter field, the dashed curve shows the projection of the field on a horizontal plane parallel to the plane of the conveyor. At points A and C the field vectors are horizontal and form an angle with each other, at point B they are nearly vertical. The nature of the field remains the same, but the size changes when moving along other lines parallel to line AC FIG. 8 shows the direction of the transmitter current in the coil and the direction of motion.

Figure 9:
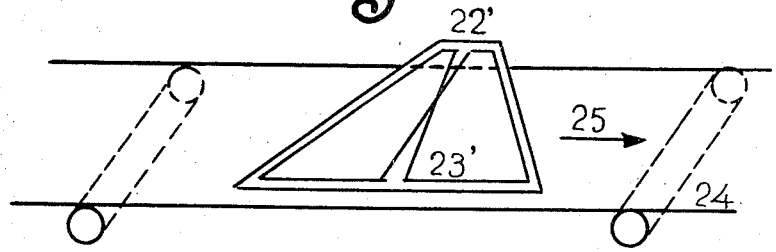
FIG. 9 shows a coil system in which both coils are on the same side of the conveyor belt.

A coil system following the basic structure can also be carried out so that the both coils 22' and 23' are either above or below the conveyor (FIG. 9). Since the signal to be detected depends greatly on the vertical position of the body, the above-mentioned construction is useful primarily in cases where the vertical position of the body to be detected does not vary much e.g. owing to a low surrounding material deposit.

Figure 10:
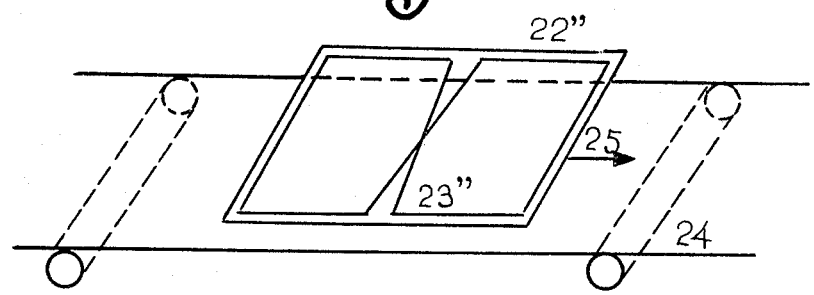
FIG. 10 shows a coil system, corresponding to that in FIG. 9, in which the coils are rectangular.

The coil construction (FIG. 10) based on the above-mentioned principles with a rectangular coil design is constructionally uncomplicated, but its sensitivity to transversely directed bodies is limited over a wide area in the middle of the conveyor. The construction is suitable primarily for weakly conducting surrounding materials, when even a small signal caused by transverse field component assures the detection.

The proportion between horizontal and vertical sensitivities can be changed when desired by distributing the coils between the upper and lower sides of the conveyor so that there are transmitting and measuring coils in both parts.

Figure 11:
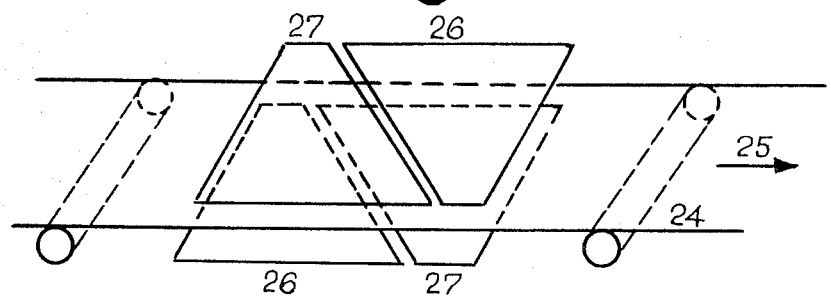
FIG. 11 shows a coils system in which the coils are distributed above and below the conveyor belt plane.
Figure 12:
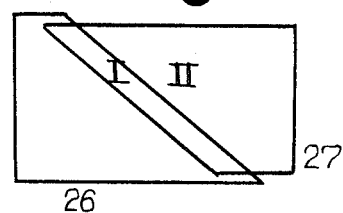
FIG. 12 shows the mutual position of the coils of FIG. 11, projected on each other.

A plane coil construction mentioned above according to the principles of the invention is shown in FIG. 11. In order to avoid a voltage in measuring coils 27 caused by the primary field of transmitting coils 26 it is necessary that the coils have an area in common so that the fluxes covered by areas I and II are of equal size and of opposite direction (FIG.12). Since the measuring coil must be connected in series for increased sensitivity, the signals caused by homogeneous surrounding material and external fields are not automatically cancelled out. If the transmitting and measuring coils are placed so that they do not have a common area (area I=0) and the difference signal of measuring coils is recorded, the signals caused by the primary field, homogeneous surrounding material and external homogeneous fields disappear. The signal caused by the body to be detected is small compared with the former constructions, and moreover it depends greatly on the vertical and horizontal position of the body on the conveyor. The use of the construction is restricted to cases with great conductivity differences when the signals of the surrounding material are small.

Figure 13:
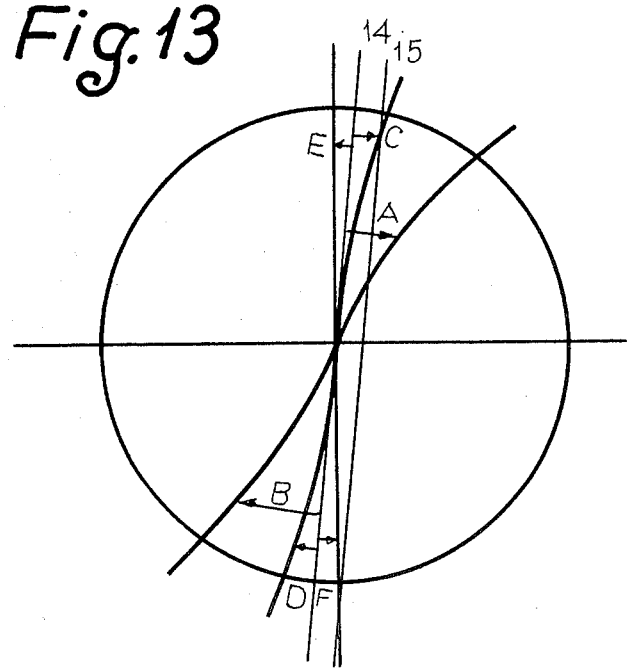
FIG. 13 shows the relationship of the different signals coming into the monitor to the alarm limit, when the monitor is designed to work with one alarm limit.

The observed and amplified signal component with correctly chosen phase is analyzed by using level monitors, logical circuits and delay circuits as follows:

Owing to the construction of the coil system the signals of the body to be detected are of different signs when the body is beneath the different loops of the measuring coil. The detection FIG. shown earlier must be completed, being now symmetric with respect to the origin (FIG. 13). The most uncomplicated monitor system uses the signals which, starting from phase line 14, cross only the positive alarm limit 15, and does not use the information coming from the latter loop of the receiver. In FIG. 13 signal A results in an alarm signal, signals B—F do not.

Figure 14:
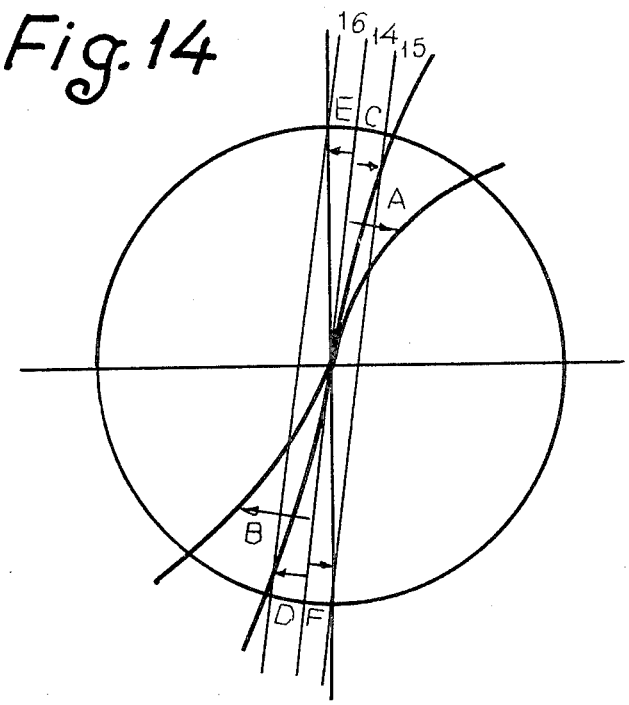
FIG. 14 shows the relationship of the different signals coming into the monitor to the alarm limits, when the monitor is designed to work with two alarm limits of opposite signs.

In another operation principle of the monitor line 14 is still the base level or phase line, line 15 is now the positive and line 16 the negative alarm limit (FIG. 14). An alarm signal is formed either when the first, positive signal crosses the positive alarm limit (case A) or when the second negative signal crosses the negative alarm limit (case B). Cases c—F do not give any alarms.

It becomes easier to find the body detected on the conveyor belt if the signal from the first half of the measuring coil is delayed compared with that from the latter half. The longitudinal position of the body on the stopped conveyor is approximately independent of the point of the detection coil where the alarm signal was formed.

When the method of FIG. 3 is utilized in order to detect even smaller bodies it has to be ascertained that the signals hitting the ruled area do not give an alarm signal. This can be done by basing the operation of the monitor on the order of the signals coming from the first and second loop of the measuring coil and crossing the alarm limits.

Figure 15:
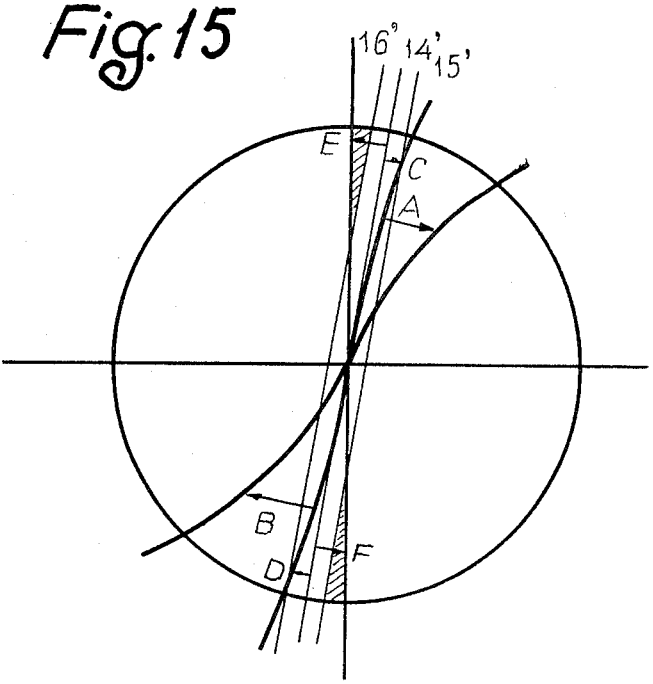
FIG. 15 shows the relationship of the different signals coming into the monitor to the alarm limits, when the monitor is designed to work depending on the incidence order of two signals of opposite signs.

The positive signal A, FIG. 15, from the first coil part opens an electronic gate circuit. A following negative signal B, picture 15, goes through the gate and causes an alarm signal.

Signals C and D do not cause detection, because they remain below the alarm limit, neither do E and F, since a negative signal E coming first does not activate the gate circuit. To avoid the situation where a signal F and a signal E from another, following body of the surrounding material could cause wrong detection, it is possible to eliminate the influence of the activating positive signal of the gate either externally or automatically if the negative signal necessary for detection has not arrived within a time interval fixed depending on the speed of the conveyor.

Figure 16:
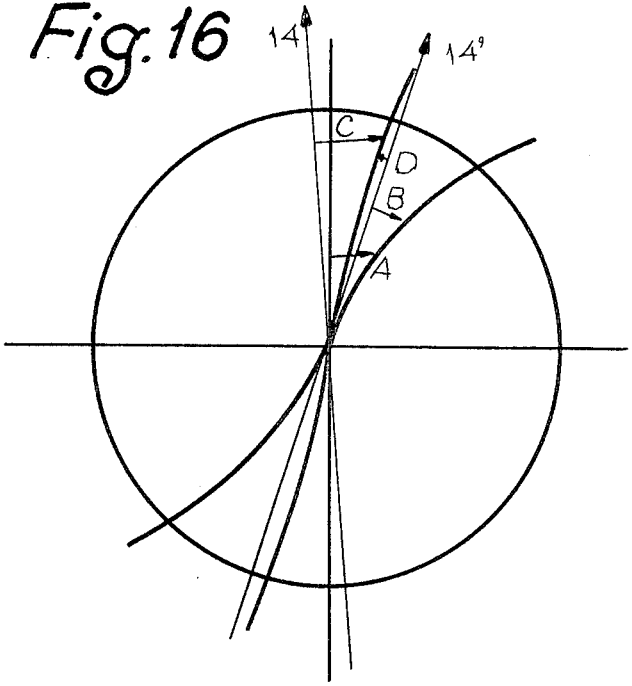
FIG. 16 shows the relationship of the different signals coming into the monitor to the alarm limits, when the monitor is designed to analyze two signal components with different phases.

A fourth monitor principle is to use two phase detectors, in which case the phase lines deviate from each other e.g. as shown in FIG. 16 by lines 14 and 14'. The surrounding material always causes signals of opposite signs, case C and D, FIG. 16, in the detector, whereas the signals from a body to be detected are of the same sign, case A and B, FIG. 16. The monitor is connected to give an alarm signal only when signals of the same sign are simultaneously received from both phasedetectors. The alarm limits can be one or two-sided in the manner described earlier, and the signals can be delayed accordingly.

We claim:

1. Apparatus for electromagnetically detecting magnetic or nonmagnetic conductive bodies such as metal bodies conveyed on a belt surrounded by a medium of material differing in electrical conductivity from the bodies to be detected and a surrounding medium comprising a transmitting coil system having at least one coil the perpendicular projection of which coil on to the plane of the conveyor is of essentially trapezoidal shape with two generally parallel sides lying generally parallel to the direction of motion of the conveyor means; means connected to said coil for generating an audio frequency primary electromagnetic field the direction and amplitude of which field are at all times different at different positions in the field at the plane of the conveyor so that when a body to be detected moves through the primary field there is a point along the line of motion of the body at which the primary field has a component in the direction of advantageous eddy current induction or magnetization of said body to such an extent as to produce a detectable secondary field irrespective of the shape, orientation and position of the body on the conveyor means; a receiving coil system having at least coil the perpendicular projection of which coil on to the plane of the conveyor is of essentially trapezoidal shape with two generally parallel sides lying generally parallel to the direction of motion of the conveyor means said receiving coil system being adapted to pick up a signal from the secondary field of the body at said advantageous point of the primary field; a signal amplifier for amplifying the signal picked up; a phase sensitive detector operating at the frequency of the primary field for producing a signal proportional to the secondary field components having a predetermined phase shift of 90° with respect to the primary field, and monitor circuitry for electronically comparing the signal from the phase sensitive detector with at least one predetermined limit value and for producing an alarm signal.

2. Apparatus as claimed in claim 1, wherein said at least one coil of the receiving coil system is so located with respect to the transmitting coil system that the total voltage induced by the transmitting coil system in the receiving coil system is zero.

3. Apparatus as claimed in claim 1, wherein said receiving coil system, includes coils with opposite winding directions arranged to receive voltage signals of equal intensity but opposite signs so that the total voltage induced by the primary field of the transmitting coil system in the receiving coil system is zero.

4. Apparatus as claimed in claim 1 wherein the transmitting coil system comprises an air-cored transmitting coil with opposite portions passing across the conveyor for producing an essential part of the primary field at the conveyor and other linking portions of the transmitting coil not essentially changing the field produced by said opposite portions.

5. Apparatus as claimed in claim 1 wherein the receiving coil system includes at least two coils crossing the conveyor, and the combined perpendicular projection of said coils on to the plane of the conveyor coincides with the perpendicular projection of the transmitting coil onto said plane whereby the influence of a body moving on the conveyor on parts of the receiving coil not crossing the conveyor does not essentially change the effect produced by the body upon said coils.

6. Apparatus as claimed in claim 1 wherein said monitor circuitry is adapted to produce an alarm signal whenever the amplitude of an observed component exceeds a predetermined limit value.

7. Apparatus as claimed in claim 1 wherein said monitor circuitry is adapted to produce an alarm signal whenever the amplitude of an observed component falls below a predetermined limit valve.

8. Apparatus as claimed in claim 1 wherein said receiving coil system includes two coils crossing the conveyor means at spaced locations whereby a body conveyed by the conveyor means passes the two coils at different times, thus producing two signals, said monitor circuitry being adapted to produce an alarm signal only when the amplitude of a first signal compared exceeds a predetermined limit and said first signal is followed within a predetermined time dependent upon the speed of the conveyor by a second signal which has an amplitude of opposite sign from that of said first signal, the amplitude of said second signal falling below a predetermined limit value.

9. Apparatus as claimed in claim 1 wherein the transmitting and receiving coil systems include curved coils.

10. Apparatus as claimed in claim 1 wherein the transmitting and receiving coil systems comprise flat coils.

11. Apparatus as claimed in claim 1 wherein the transmitting and receiving coil systems include air cored coils, and at least one iron cored coil of equivalent construction to said air cored coils.

12. Apparatus as claimed in claim 1 wherein said transmitting and receiving coil systems constitute a coil arrangement with coils as parts of an alternating current bridge, each coil operating both as a transmitter and as a receiver, an out-of-balance signal of said bridge acting as said signal proportional to the secondary field components of the body to be detected and of the surrounding medium.